United States Patent
Kuwahara et al.

(10) Patent No.: US 6,925,046 B2
(45) Date of Patent: Aug. 2, 2005

(54) OPTICAL HEAD DEVICE AND OPTICAL DISK UNIT CAPABLE OF STABLE SIGNAL REPRODUCTION

(75) Inventors: Maho Kuwahara, Tokyo (JP); Katsuo Iwata, Tokyo (JP); Shintaro Takehara, Yokohama (JP); Sumitaka Maruyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 499 days.

(21) Appl. No.: 10/100,172

(22) Filed: Mar. 19, 2002

(65) Prior Publication Data

US 2003/0058770 A1 Mar. 27, 2003

(30) Foreign Application Priority Data

Sep. 26, 2001 (JP) .......................................... 2001-294849

(51) Int. Cl.[7] ................................................ G11B 7/00
(52) U.S. Cl. .............................. 369/112.24; 369/53.2; 369/53.26
(58) Field of Search ............................. 369/44.32, 47.5, 369/53.12, 53.13, 53.14, 53.2, 53.22, 53.23, 53.25, 53.26, 53.27, 112.01, 112.23, 112.24, 116

(56) References Cited

U.S. PATENT DOCUMENTS 6,730,896 B1 * 5/2004 Yamada .................... 250/201.5

FOREIGN PATENT DOCUMENTS

| JP | 3-160632 | 7/1991 |
| JP | 11-110802 | 4/1999 |
| JP | 11-259906 | 9/1999 |
| JP | 2000-30290 | 1/2000 |
| JP | 2001-110082 | 4/2001 |

* cited by examiner

Primary Examiner—Paul W. Huber
(74) Attorney, Agent, or Firm—Pillsbury Winthrop Shaw Pittman LLP

(57) ABSTRACT

The present invention relates to an optical head unit and an optical disk unit using the optical head unit. The head unit includes a wavefront transforming optical element control unit to controls a wavefront transforming optical element so as not to transform wavefront of a light beam focused on a recording layer by a focusing unit due to the thickness error of a light transmission layer positioned between the recording layer and the focusing unit based on an electrical signal outputted from a first light detector, and an output control unit that controls light amount of a light beam radiated by a light emitting unit based on the magnitude of the electrical signal outputted from the light detector.

4 Claims, 6 Drawing Sheets

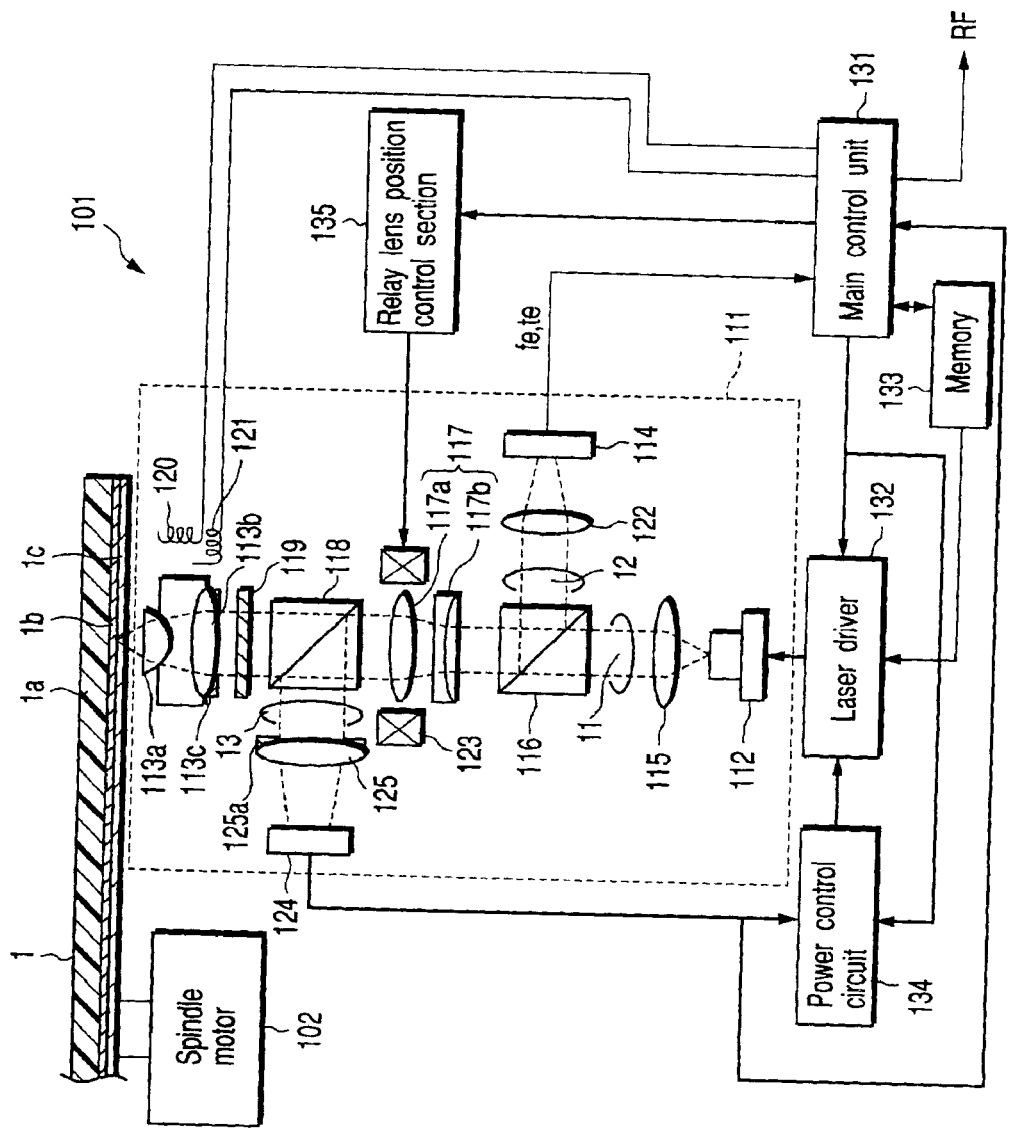
F I G. 1

OPTICAL HEAD DEVICE AND OPTICAL DISK UNIT CAPABLE OF STABLE SIGNAL REPRODUCTION

CROSS-REFERENCE TO RELATED APPLICATIONS

This application is based upon and claims the benefit of priority from the prior Japanese Patent Application No. 2001-294849, filed Sep. 26, 2001, the entire contents of which are incorporated herein by reference.

BACKGROUND OF THE INVENTION

1. Field of the Invention

The present invention relates to an optical head for recording information into an optical disk and reproducing information from the optical disk and an optical disk unit having the optical head. In addition, the present invention relates to a method for eliminating an effect of a spherical aberration caused by the thickness error of a surface resin layer of an optical disk.

2. Description of the Related Art

In an optical head and an optical disk unit, in order to improve efficiency of utilizing light, there has been proposed a method and apparatus for reducing an effect of spherical aberration caused by the thickness error of a surface resin layer (light transmission layer) of an optical disk.

For example, in Jpn. Pat. Appln. KOKAI Publication No. 11-259906, there is disclosed an optical head 1 for emitting light from a light transmission layer 4 in a recording layer provided between a substrate 3 and the light transmission layer 4, wherein a collimator lens 13 and an actuator 14 for a collimator lens are provided, and the collimator lens 13 provided between a light source 10 and an objective lens 16 is moved so as to offset a spherical aberration caused by the thickness error of the light transmission layer 4.

In Jpn. Pat. Appln. KOKAI Publication No. 11-259906, when the collimator lens 13 is moved in order to correct the spherical aberration caused by the thickness error of the light transmission layer 4, no consideration is taken into the fact that a light amount on the objective lens 16 changes. This causes a problem in the case where light amount is set during reproduction in particular.

That is, when the collimator lens is moved in an optical axis direction in order to correct the spherical aberration caused by the thickness error of the light transmission layer, it is known that a quantity of light incident to the objective lens changes, and thus, the light amount emitted from the objective lens changes, making it difficult to ensure stable reproduction.

BRIEF SUMMARY OF THE INVENTION

The present invention has been made in order to solve the foregoing problem. It is an object of the present invention to provide an optical head and an optical disk unit capable of ensure stable signal reproduction.

According to an aspect of the present invention, there is provided an optical disk unit that emits a light beam to an optical disk, which includes an information recording layer and a light transmission layer for protecting the information recording layer, and that causes the light beam to fall the optical disk from the light transmission layer, thereby recording information or reproducing information, comprising:

a light emitting unit that emits a light beam with a predetermined wavelength;

a focusing unit configured to focus the light beam from the light emitting unit at a predetermined position of the information recording layer of the optical disk;

a wavefront transforming optical element provided along an optical axis defined between the light emitting unit and the focusing unit, to transform a wavefront of the light beam guided to the focusing unit to the light emitting unit;

a thickness difference detection unit to detect a thickness difference of the light transmission layer of the optical disk positioned between the focusing unit and the information recording layer of the optical disk;

a wavefront transforming optical element control unit to control the wavefront transforming optical element, the wavefront transforming optical element is reducing a spherical aberration based on a thickness error of the light transmission layer of the optical disk;

a beam splitter provided between the wavefront transforming optical element and the focusing unit, the beam splitter reflecting in a predetermine direction a part of the light beam oriented from the wavefront transforming optical element to the focusing unit;

a light detector that receives a light beam split from the light beam oriented from the wavefront transforming optical element to the focusing unit by the beam splitter, and outputs an electrical signal corresponding to the light amount of the received light beam; and an output control unit that controls the light amount of the light beam radiated by the light emitting unit based on the magnitude of the electrical signal outputted from the light detector.

According to an other aspect of the present invention, there is provided an information recording reproducing apparatus for recording information into a recording medium using a light beam or reproducing information recorded in the recording medium by a light beam, comprising:

an optical head unit including:

a light emitting unit that radiates a light beam with a predetermined wavelength;

a focusing unit that focuses the light beam from the light emitting unit at a predetermined position of a recording layer;

a first beam splitter provided between the light emitting unit and the focusing unit, the first beam splitter splits the light beam oriented from the light emitting unit and a reflection light beam reflected on the recording layer from each other;

a first light detector that outputs an electrical signal corresponding to light amount of the reflection light beam split by the first beam splitter;

a wavefront transforming optical element provided along the optical axis defined between the light emitting unit and the focusing unit, the wavefront transforming optical element changing the wavefront of the light beam guided from the light emitting unit to the focusing unit;

a wavefront transforming optical element control unit that controls the wavefront transforming optical element based on the electrical signal outputted from the light detector so as not to transform the wavefront of the light beam focused on the recording layer by the focusing unit due to the thickness error of a light transmission layer positioned between the recording layer and the focusing unit;

a second beam splitter provided between the waveform transforming optical element and the focusing unit, the second beam splitter reflecting in a predetermined direction a part of the light beam oriented from the waveform transforming optical element to the focusing unit;

a second light detector that receives a light beam split from the light beam oriented from the wavefront transforming optical element to the focusing unit by the second beam splitter, and outputs an electrical signal corresponding to the light amount of the received light beam; and an output control unit that controls the light amount of the light beam radiated by the light emitting unit based on the magnitude of the electrical signal outputted from the light detector;

a motor that rotates an optical disk at a predetermined speed;

a control unit that outputs an electrical signal received and converted in a photoelectric manner by the first detector of the optical head unit as information recorded in the optical disk; and a memory that supplies information to be recorded, to the output control unit of the optical head unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram illustrating an example of an optical head unit and an optical disk unit utilizing the optical head unit according to the present invention;

DETAILED DESCRIPTION OF THE INVENTION

Figure 2:
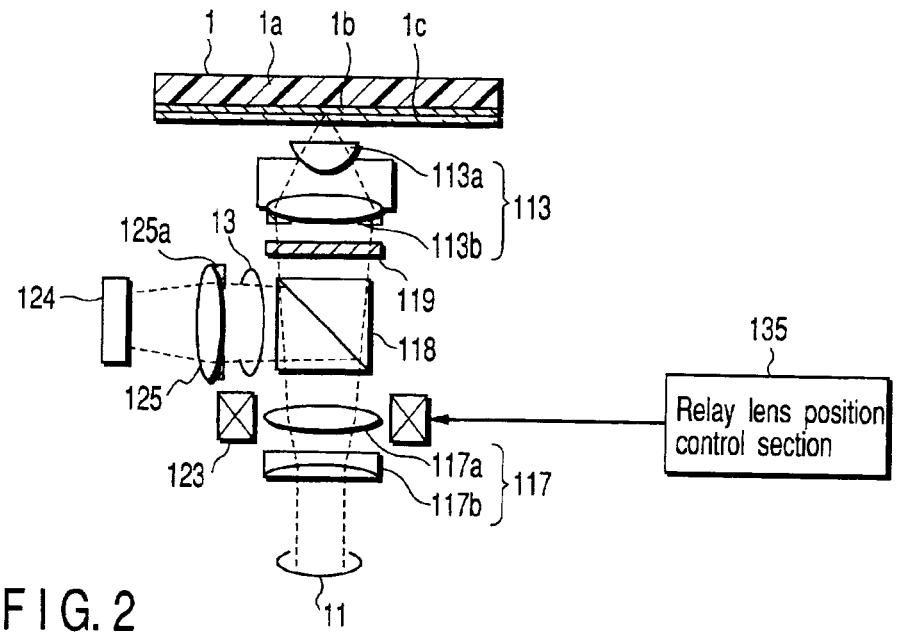
FIG. 2 is a schematic diagram illustrating an exemplary operation of the optical head unit shown in FIG. 1.

Hereinafter, preferred embodiments of the present invention will be described in detail with reference to the accompanying drawings.

As shown in FIG. 1, an optical disk unit 101 for recording information into an information recording medium, i.e., an optical disk 1, and reproducing information from the optical disk 1 includes, a spindle motor 102 that rotates the optical disk 1 at a predetermined speed, and an optical head unit 111 that emits a light beam in a predetermined spot diameter to the optical disk 1 and receiving the reflection light beam reflected at the optical disk, thereby obtaining a predetermined electrical signal.

The optical disk 1 is composed of a phase change type recording layer 1b provided at one face of a substrate 1a in a predetermined thickness, and a transparent protection layer (light transmission layer) 1c that covers the recording layer 1b. The thickness of the substrate 1a is about 1.1 mm, and the thickness of the transparent protection layer 1c is about 0.1 mm. In addition, the thickness of the recording layer 1b is n×10 micrometers. Although not shown, a reflection film and/or a protection layer may be provided at the recording layer 1b.

The optical head unit 111 has a laser unit 112 that emits a light beam (laser beam) in a predetermined wavelength to the optical disk 1, an objective lens 113 that focuses a laser beam 11 emitted from the laser unit 112 at the recording layer 1b of the optical disk 1, and a first light detector 114 that receives a reflection laser beam 12 reflected at the recording layer 1b of the optical disk 1, and outputs an electrical signal corresponding to the light amount.

Between the laser unit 112 and the objective lens 113, there are provided in order from the laser unit 112, a collimator lens 115, a first beam splitter 116, a relay lens (a wavefront transforming optical element) 117, a second beam splitter 118 and a λ/4 wavelength plate 119. The collimator lens 115 that collimates the laser beam 11 radiated from the laser unit 112. The first beam splitter 116 that splits the laser beam 11 collimated by the collimator lens 115 and the reflection laser beam 12 reflected at the recording layer 1b of the optical disk 1 from each other. The relay lens (a wavefront transforming optical element) 117 capable of correcting a spherical aberration of the laser beam 11 collimated by the collimator lens 115. The second beam splitter 118 that splits the laser beam 11 passing through the relay lens 117 to be oriented to the recording layer 1b of the optical disk 1 and a laser beam 13 reflected on a beam splitting surface of the second beam splitter 118 each other. The λ/4 wavelength plate 119 that matches isolation between the laser beam 11 oriented from the laser unit 112 to the recording layer 1b of the optical disk 1 and the reflection laser beam 12 reflected at the recording layer 1b of the optical disk 1.

In the optical head unit 111 shown in FIG. 1, in general, in order to reduce thickness in a direction parallel to the recording face of the optical disk 1, the laser beam 11 passed through the second beam splitter 118 and incident to the objective lens 113 is deflected by 90 degrees by a mirror (turn up mirror) which is not shown.

The laser unit 112 is a semiconductor laser diode, for example, and radiates a laser beam 11 of 400 nm in wavelength, for example.

The laser unit 112 emits the laser beam 11 with the corresponding light amount by light emission according to each of ones for the recording, reproduction, and erasing light intensities being instructed by a laser driver 132 connected to a main control unit 131. A laser amount of the laser beam emitted from the laser unit 112 is intensity modulated by the laser driver 132 in accordance with recording data held in a memory 113 during recording. In addition, during reproduction, a light amount of the laser beam emitted from the laser unit 112 is 1/n to 1/n×10 of that of the recording laser beam. On the other hand, during erasing, a laser beam having a predetermined light amount between the light amount of reproduction laser beam and the light amount of recording laser beam.

The objective lens 113 includes of two lenses 113a and 113b, and the number of apertures indicated by NA is set within the range from 0.8 to 0.95. For example, in the embodiments of the present invention, NA is about 0.85.

At a predetermined position of a lens holder (not shown) that holds the objective lens 113, in order to ensure a distance between the objective lens 113 and the recording layer 1b of the optical disk 1 coincides with a focal length of the objective lens 113, there are provided, a focus coil 120 for generating a propelling force for moving the objective lens 113 along an optical axis O defined between the laser unit 112 and the objective lens 113, and a magnetic field generating unit (not shown) that generates a magnetic field that is resistive to the propelling force provided by the focus coil 120.

At a predetermined position of a lens holder (not shown), there are provided, a track coil 121 that generates a propelling force to ensure that the center of the laser beam 11 passing through the objective lens 113 coincides with a predetermined position in the radial direction of the recording layer 1b of the optical disk 1, for example, the center of a pit row (not shown) or guide groove (not shown) formed in advance at the recording layer 1b, and a magnetic field generating unit (not shown) that generates a magnetic field that is resistive to the propelling force from the track coil 121.

To the reflection laser beam 12 split from the laser beam oriented to the optical disk 1 by the first beam splitter 116, a predetermined convergence (imaging characteristic) is provided by a first focusing lens 122 provided between the splitter and the first light detector 114. The resultant laser beam is imaged in a detection region (not shown) of the first light detector 114. The first beam splitter 116 is a well known PBS (Polarization Beam Splitter), wherein the reflection laser beam 13 emitted from the laser unit 112, passing through the λ/4 plate 119, reflected on the recording face 1b of the optical disk 1, and returned after the beam has transmitted the λ/4 plate 119 is incident to the light detector 114.

The first light detector 114 has a plurality of detection regions of a predetermined shape and area (not shown). The detector 114 receives, an imaging pattern of a reflection laser beam that can be used to specify a position of the objective lens 113 requested when setting the magnitude of a control current to be supplied to the focus coil 120 and track coil 121 and an imaging pattern that can be used to generate a reproduction signal (RF signal) of information recorded in the optical disk 1. Then, the light detector 114 outputs an electrical signal (current according to light amount) of a predetermined magnitude corresponding to the respective imaging patterns. An output from each detection region (not shown) of the light detector 114 is converted into a voltage signal by an amplifier with current—voltage converter (I/V amplifier) that is integrally formed (not shown).

The relay lens 117 includes first and second lenses 117a and 117b disposed along the optical axis O. One of these two lenses, i.e., the lens 117a in the present embodiment is formed to be movable along the advancement direction (optical axis O) of the laser beam 11. The first lens 117a is a convex lens, for example, and the second lens 117b is a concave lens, for example. A position control coil 123 that generates a propelling force for moving the lens 117a and a magnetic field generating unit (not shown) that generates a magnetic field that is resistive to the propelling force from the position control coil 123 are provided at a lens holder (not shown) that holds a movable lens, i.e., the convex lens 117a. One lens of the relay lens 117, i.e., the convex lens 117a in the present embodiment is moved along the optical axis O from a magnetic field generated by the magnetic field generating unit and a magnetic field generated by a current being supplied to the position control coil 123. The magnitude of the current supplied to the position control coil 123 is set to a predetermined magnitude set by a relay lens position control section described layer based on a predetermined electrical signal generated by the first light detector 114.

In a direction in which a third laser beam 13 split from the laser beam 11 oriented to the optical disk 1 by the second beam splitter 118 is oriented, there are provided: a second light detector 124 that receives the third laser beam 13 and outputs an electrical signal corresponding to the light amount and a second imaging lens 125 that provides a predetermined convergence (imaging characteristic) to the third laser beam 13 toward the second light detector 124. A ratio of divergence between the laser beam 11 and the laser beam 13 caused by the second beam splitter 118 is set to 9 (laser beam 11):1 (laser beam 13), for example.

To the third laser beam 13 split from the laser beam 11 oriented to the optical disk 1 by the second beam splitter 118, a predetermined convergence (imaging characteristic) is provided by the second imaging lens 125, and the resultant beam is focused in a detection region (not shown) of the second light detector 124. On a light incident face (face of the second beam splitter 118) of the second imaging lens 125, there is provided an aperture 125a for detecting the light amount of the laser beam 13, has a diameter approximately same diameter of the aperture 113a of the objective lens 113, changed by movement in the optical axis direction of one lens (convex lens 117a) of the relay lens 117. That is, the second imaging lens 125 has an opening whose size is approximately equal to that of an opening of the objective lens 113 by the aperture 125a.

The second light detector 124 has a detection region of a predetermined shape and area (not shown) capable of monitoring the light amount of the laser beam 11 oriented to the optical disk 1 passed through the relay lens 117. This detector 124 outputs an electrical signal of a predetermined magnitude that corresponds to the light amount of the received laser beam 13. The electrical signal outputted from this second light detector 124 is inputted to a power control circuit 134. The signal inputted to the power control circuit 134 is fed back to a laser driver 132 under the control of a main control unit 131 as a signal indicating a change in intensity of the first laser beam 11. The power control circuit 134 is refereed to as a second light detector, which is generally called an APC light detector. This circuit 134 monitors the light amount of the monitoring laser beam 13 outputted from the second light detector 124. An output of the power control circuit 134 is used for feedback control of a laser drive signal supplied from the laser driver 132 to the laser unit 112 after a predetermined gain has been provided by a gain controller (not shown). In this manner, the light amount is constantly controlled after transmitting the relay lens 117 of the laser beam 11 emitted from the laser unit 112 and oriented to the objective lens 113.

Now, a relay lens position control section will be described here.

A relay lens position control section 135 supplies a drive current has a predetermined value to the position control coil 123. The drive current has a direction in which the convex lens 117a is moved to the laser unit 112 or a direction in which the convex lens 117a is moved to the objective lens 113 based on the predetermined electrical signal outputted from the first light detector 114.

When a drive current in a predetermined direction is supplied to the position control coil 123, whereby the convex lens 117a is moved to the laser unit 112, the diameter of the laser beam 11 incident to the objective lens 113 is increased as shown in FIG. 2. In this case, there is also increased the diameter of the third laser beam split by the second beam splitter 118 and oriented to the second lens 125 and the second light detector 124.

On the other hand, when a drive current in a direction providing movement in a direction opposite to a direction that enables movement of the convex lens 117a shown in FIG. 2 is supplied to the position control coil 123, the convex lens 117b is moved to the objective lens 113. In this case, the diameter of the third laser beam split by the second beam splitter 118 and oriented to the second lens 125 and the second light detector 124 is decreased as shown in FIG. 3.

In detail, in the relay lens 117, when the thickness of the light transmission layer 1c of the optical disk 1 is set to a specified value, for example, 0.1 mm, the laser beam 11 oriented from the laser unit 112 to the recording layer 1b of the optical disk 1 while a drive current is not supplied to the position control coil 123 is designed so as to be incident as light parallel to the objective lens 113.

Figure 3:
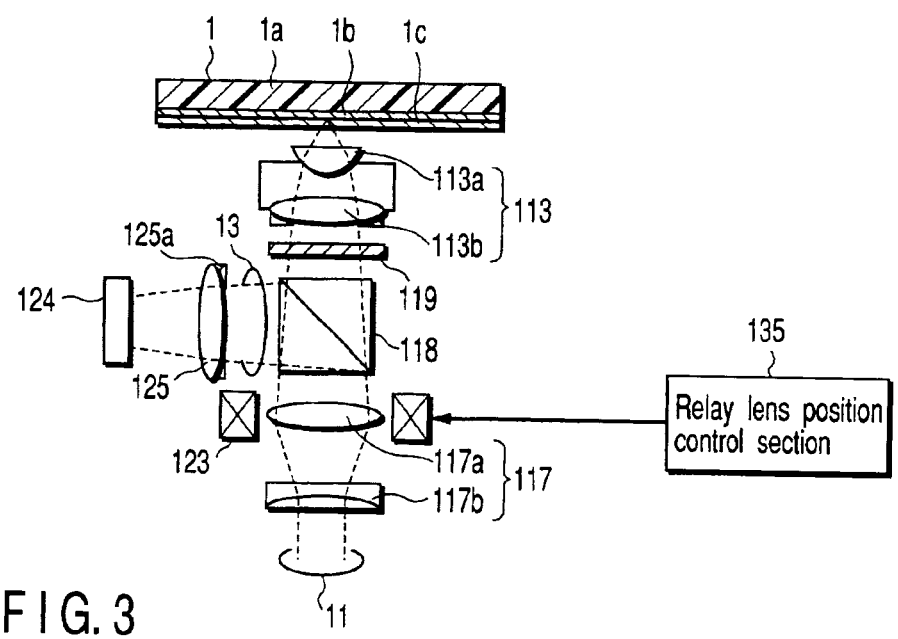
FIG. 3 is a schematic diagram illustrating an exemplary operation of the optical head unit shown in FIG. 1, illustrating an exemplary operation in a direction opposite to that shown in FIG. 2.

In contrast, when the thickness of the light transmission layer 1c of the optical disk 1 is set to thickness deviated from a predetermined thickness, the drive current in a direction in which the convex lens 117a is moved is supplied in any direction as shown in FIG. 2 or FIG. 3 to the position control coil 123 by the relay lens position control section 135. That is, in the case where the thickness of the light transmission layer 1c of the optical disk 1 is deviated from the specified thickness, a spherical aberration caused by the thickness error of the light transmission layer 1c occurs. Thus, in order to correct the spherical aberration caused by the thickness error of the light transmission layer 1c, the convex lens 117a of the relay lens 117 is moved by a predetermined amount in a predetermined direction.

In more detail, when the thickness of the light transmission layer 1c of the optical disk 1 comes out of the specified value, the convex lens 117a of the relay lens 117 is moved along the optical axis according to the direction (error amount) in thickness error of the light transmission layer 1c of the optical disk 1, and the laser beam 11 incident to the objective lens 113 is changed to convergence light or divergence light, whereby an effect of the spherical aberration caused by the thickness error of the light transmission layer 1c can be eliminated.

Specifically, when the thickness of the light transmission layer 1c of the optical disk 1 is larger than the predetermined value, the convex lens 117a of the relay lens 117 may be moved along the optical axis O so that the laser beam 11 incident to the objective lens 113 is produced as divergence light according to the error amount in thickness of the light transmission layer 1c. In contrast, when the thickness of the light transmission layer 1c is smaller than the predetermined value, the convex lens 117a of the relay lens 117 may be moved along the light axis O so that the laser beam 11 incident to the objective lens 113 is produced as convergence light according to the error amount in thickness of the light transmission layer 1c.

In other words, the convex lens 117a (either one of the convex lens and concave lens) of the relay lens 117 is moved in any direction shown in FIG. 2 or FIG. 3, and the laser beam 11 incident to the object lens 113 is converted into convergence light or divergence light so as to correct the spherical aberration caused by the thickness error of the light transmission layer 1c of the optical disk 1. That is, the laser beam 11 passed through the object lens 113 and focused in the recording layer 1b of the optical disk 1 is focused into the recording layer 1b in a focusing spot shape distorted according to a degree of error in the case where an error occurs with the thickness of the light transmission layer 1c positioned in front of the recording layer 1b. Here, the laser beam 11 incident to the objective lens 113 is made divergent or convergent when the convergence properties or divergent light and polarity (orientation) approximately equal to a quantity of the spherical aberration applied to the laser beam 11 due to the thickness error of the light transmission layer 1c in size and assigned by the thickness error of the light transmission layer 1c are reversed, whereby an effect of the thickness error of the light transmission layer 1c can be offset by a distance between the convex lens 117a and concave lens 117b of the relay lens 117.

However, the laser beam 11 oriented to the optical disk 1 is converged or diverged by correcting the effect of the spherical aberration caused by the thickness error of the light transmission layer 1c of the optical disk 1, and the light amount of the laser beam 11 incident to the objective lens 113 changes upon the receipt of an opening restriction caused by an aperture 113c provided at the objective lens 113. That is, even if the light amount of the laser beam 11 radiated from the laser unit 112 is constantly maintained, the light amount of the laser beam 11 focused on the recording layer 1b of the optical disk 1 through the objective lens 113 is changed by the relay lens 117 according to an extent such that the thickness error of the light transmission layer 1c of the optical disk 1 is corrected.

This indicates that the light amount of the laser beam 11 radiated at the recording layer 1b of the optical disk 1 changes during reproduction of the information recorded in the optical disk 1, and the light amount irradiated to the recording layer 1b of the optical disk 1 (that is, energy for phase changing the recording layer 1b) is changed. This also means that recording of information into the recording layer 1b of the optical disk 1 and reproduction of information from the recording layer 1b are unstable.

The optical disk unit 101 and the optical head unit 111 according to the present invention configures a monitor system for the power control circuit 134 (the second light detector 124 and the second lens 125, generally referred to as an APC monitor system) so as to make it possible to monitor the light amount of the laser beam 11 after correcting the thickness error, i.e., spherical aberration of the light transmission layer 1c of the optical disk 1. In this way, even if there occurs the thickness error of the light transmission layer 1b of the optical disk 1, it is possible to eliminate a change in light amount caused by such effect.

For example, an opening restriction equal to that of the objective lens 113 is applied to the second lens 125 of the APC monitor system, thereby making it possible to detect in the APC detecting system a change in total light amount of the laser beam 11 passing through the objective lens 113 due to the convergence or divergence of the laser beam 11 produced by correcting the spherical aberration that is the thickness error of the light transmission layer 1c of the optical disk 1 (this opening restriction does not need to be completely equal to the objective lens, and the linearity may be maintained).

The APC detecting system according to the present invention makes it possible to correct a change in light amount of the laser beam 11 caused by a well known temperature change with respect to radiation characteristics of the laser beam 11 caused by the laser unit 112.

Figure 4:
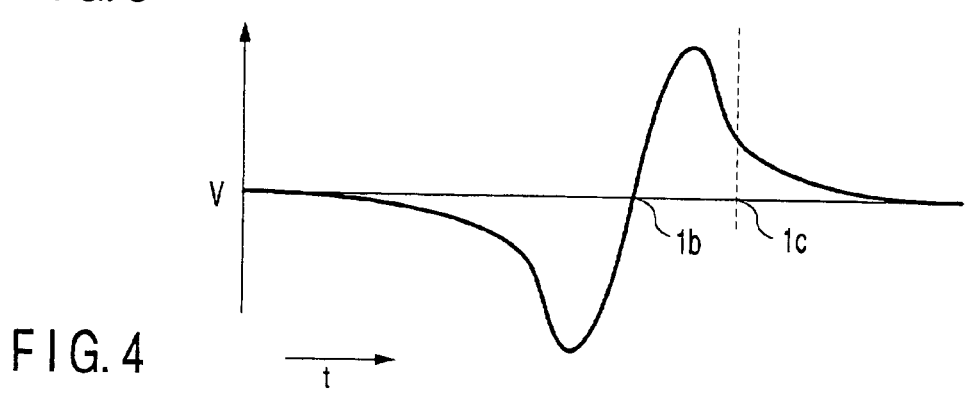
FIG. 4 is a graph illustrating an example of output characteristics of a focus error signal of the optical head unit shown in FIGS. 1 to 3.

For example, as a method for detecting the thickness of the light transmission layer 1c of the optical disk 1, first, consider that a lens holder or an actuator (not shown) that holds the objective lens 113 is moved in the optical axis direction, and the objective lens 113 is moved in the optical axis direction (focusing direction). A focus error signal output from the first light detector 114 as the objective lens 113 approaches the recording layer 1b of the optical disk 1 indicate a letter S like in which polarity is inverted at a position of the recording layer 1b, as shown in FIG. 4.

At this time, when the optical disk 1 is inactive (does not rotate), the movement distance of the objective lens 113 can be associated with a current value supplied to the focus coil 120. That is, the thickness of the light transmission layer 1c can be detected from an S-letter like curve of the focus error signal indicating a current value supplied to the focus coil 120 and a positional deviation in laser beam to be converged in a predetermined distance by the objective lens 113 around the recording layer 1b.

One lens of the relay lens 117, the convex lens 117a in this example is moved in a predetermined quantity so as to offset the spherical aberration that is an error in the thickness according to the thus detected thickness of the light transmission layer 1c of the optical disk 1, whereby the light amount of the laser beam 11 incident to the objective lens 113 can be constantly maintained.

For the third laser beam 13 for the APC monitor diverged from the laser beam 11 oriented to the optical disk 1 by the second beam splitter 118 as well, one lens of the relay lens 117 is moved, and a light flux is converged or diverged. However, as a result of the opening restriction caused by the aperture 125a provided at the second lens, the light amount of the laser beam 13 incident to the second lens 125, i.e., the second light detector 124 is maintained approximately constantly irrespective of a position of one lens of the relay lens 117, i.e., the convex lens 117a as described above using FIG. 2 and FIG. 3. Therefore, the magnitude of an output for power monitor outputted from the second light detector 124 is precisely reflected at the light amount of the laser beam 11 (13) radiated by the laser unit 112 irrespective of a position of the convex lens 117a of the relay lens 117.

In the first embodiment shown in FIG. 1 to FIG. 3, there has been illustrated an example of detecting the thickness of the light transmission layer 1c before the optical disk 1 rotates. However, for example, an information indicating, for indicating a change in thickness of the light transmission layer 1c, is recorded in advance in a predetermined region of the recording layer 1b of the optical disk 1, whereby, prior to recording or reproduction, the information indicating a change in thickness of the light transmission layer 1c is read, and a position of the convex lens 117a of the relay lens 117 may be controlled so as to offset an effect of the thickness error of the light transmission layer in a region or at a position where the thickness of the light transmission layer 1c changes.

Figure 5:
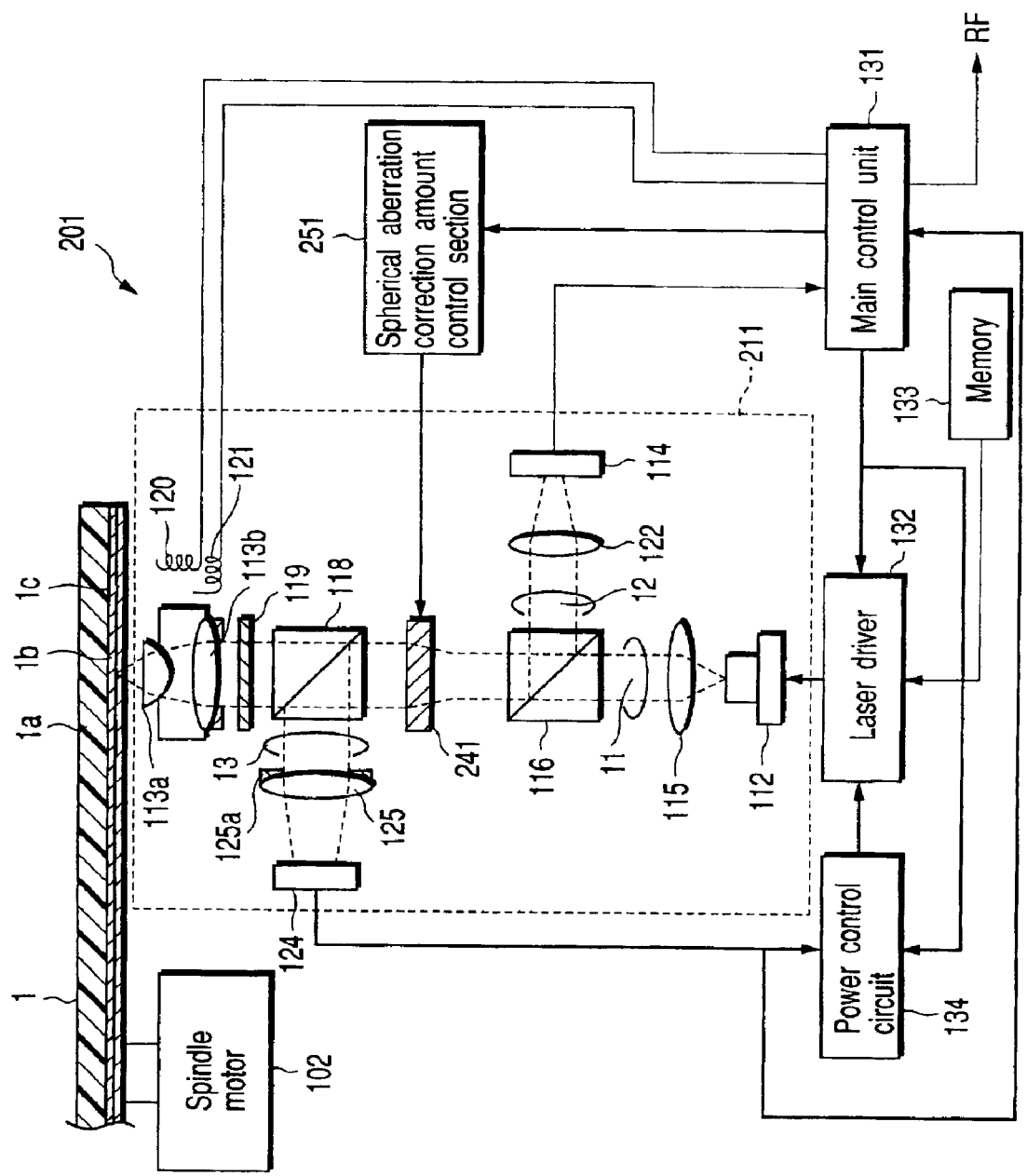
FIG. 5 is a schematic diagram illustrating an example of another embodiment of the optical disk shown in FIG. 1.

In addition, in the above described embodiment, there has been illustrated an example of a method for correcting a change in light amount of the laser beam caused by the thickness error of the light transmission layer 1c positioned between the recording layer 1b of the optical disk 1 and the laser unit 112, wherein the relay lens 117 includes the convex lens 117a and the concave lens 117b is used, thereby moving one of these lenses. However, in correcting a spherical aberration, as shown in FIG. 5, similar advantageous effect is obtained by using an optical element capable of changing a refractive index by an external signal, for example, a liquid crystal element (changeable refractive index depending on an applied voltage) 241 of ECB (Electrically Controlled Birefringence) type and a spherical aberration correction quantity control unit 251 for changing a refractive index of the liquid crystal element 241. In the configuration shown in FIG. 5, the liquid crystal element 241 of ECB type is used instead of the relay lens 117 of the optical head unit 111 and the position control coil 123 shown in FIG. 1, and the relay lens position control 135 is merely replaced with the spherical aberration correction quantity control section 251, and thus, a detailed description of the other common configuration is omitted here.

In this case, as a control value supplied to the spherical aberration correction quantity control unit 251, of course, there can be used as is the control value indicating the position of the objective lens 113 obtained from the output signal outputted from the first light detector 114 shown in FIG. 1 to FIG. 3.

In the above described embodiment, although a description has been given by way of an example of an optical disk of phase change type, the present invention can be used for a variety of optical head units and optical disk units for recording media each having a light transmission layer. In addition, a reproduction only disk, a magneto-optical disk, an optical card or the like can be applied as a recording medium.

Now, a second embodiment of the optical disk unit according to the present invention will be described with reference to FIGS. 6A and 6B. Like elements of the optical disk unit shown in FIG. 1 are designated by like reference numerals. A detailed description is omitted here.

Figures 6A, 6B:
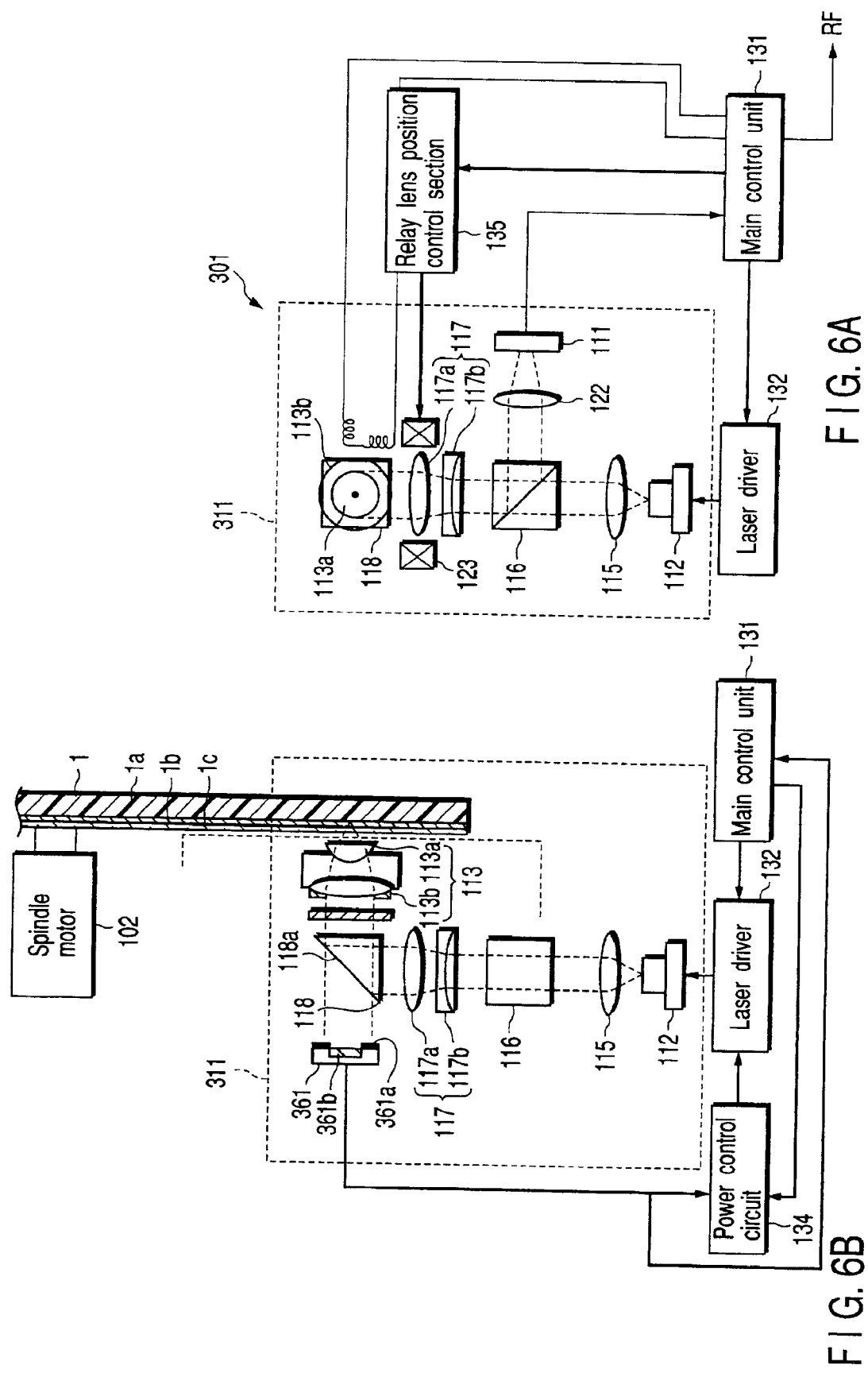
FIGS. 6A and 6B are diagrams illustrating an example of still another embodiment of the optical disk unit shown in FIG. 1.

In an optical disk unit 301 shown in FIGS. 6A and 6B, the third laser beam 13, split from the laser beam 11 oriented to the optical disk 1 by a second beam splitter 318, is focused to a light detector 361 in which an aperture 361a of a predetermined size is integrally provided on a light incident face thereon. The size of a light detection region (light receiving face) 361b of the light detector 361 is defined to be smaller as compared with the laser beam 11 of which a predetermined sectional shape (area) is provided by the relay lens 117. That is, on the light receiving face 361b of the light detector 361, advantageous effect of an opening restriction is attained by the aperture 361a.

In this way, in the optical disk unit 301 shown in FIGS. 6A and 6B, there is shown advantageous effect caused by a combination of the imaging lens 125 and the light detector 124 having provided thereat the aperture 125a described previously with reference to FIG. 1. The light detector 361 can be directly provided at a position proximal to the second beam splitter 318 or a face on which the third laser beam 13 of the second beam splitter 318. Therefore, the size of an optical head unit 311 can be configured compactly.

In addition, in the optical head unit 311 shown in FIGS. 6A and 6B as well, as in the optical head unit 111 shown in FIG. 1, in order to reduce thickness in a parallel to the recording face of the optical disk 1, the laser beam 11 passed through the second beam splitter 318 and incident to the objective lens 113 is deflected by 90 degrees by a mirror (turn up mirror). The mirror may be compatible with a beam split face 318a of the second beam splitter 318, as shown in FIG. 6B.

In addition, the optical disk unit shown in FIGS. 6A and 6B as well can be used for a variety of optical head units and optical disk units for recording media each having a light transmission layer without being limited to an optical disk of phase change type. In addition, a reproduction only disk, a magneto-optical disk, an optical card or the like is employed as an applicable recording medium.

Now, a third embodiment of the optical disk unit according to the present invention will be described with reference to FIG. 7. Like elements of the optical disk unit shown in FIG. 1 (FIGS. 6A and 6B) are designated by like reference numerals. A detailed description will be omitted.

Figure 7:
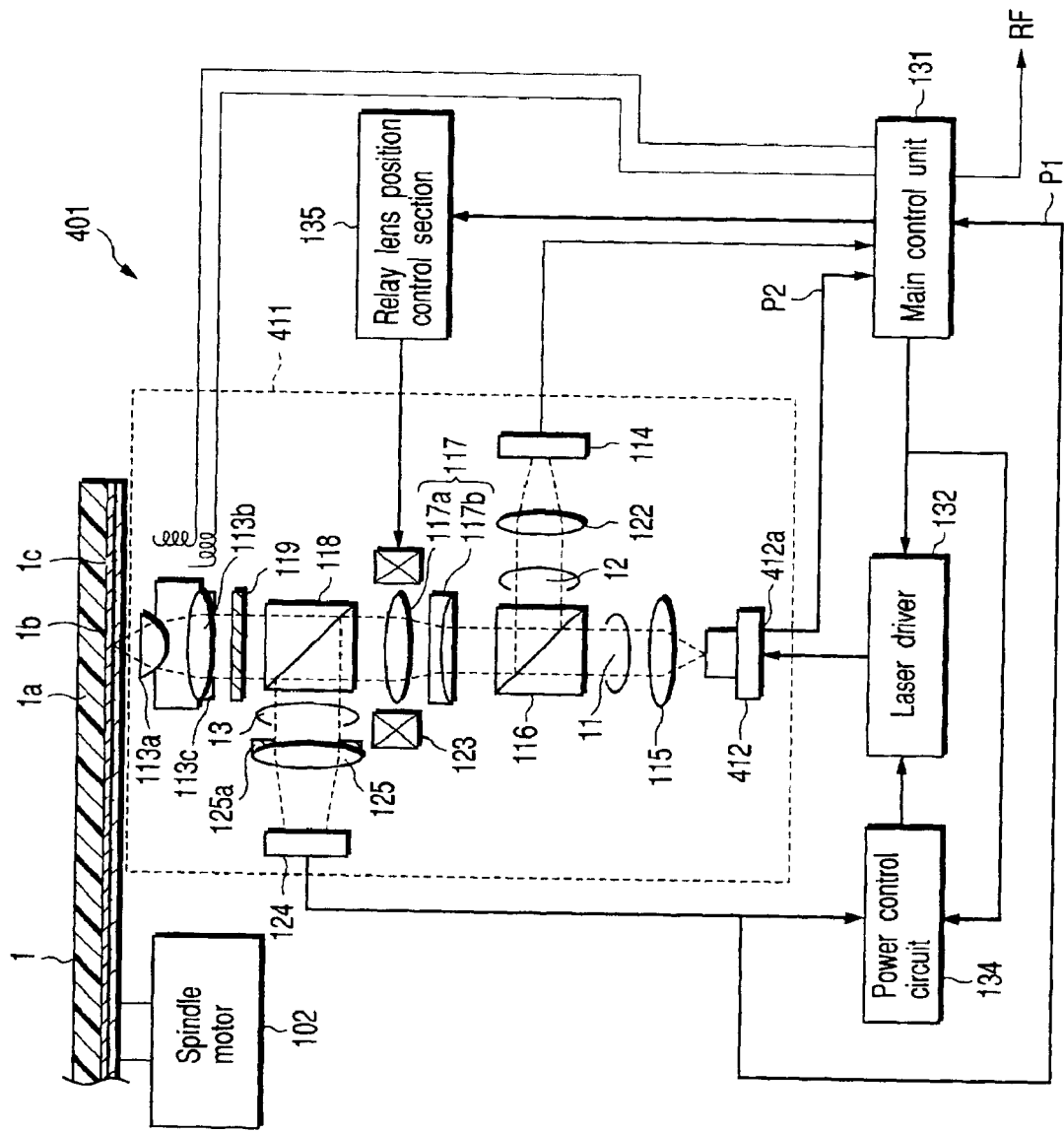
FIG. 7 is a schematic diagram illustrating an example of yet another embodiment of the optical disk unit shown in FIG. 1.

An optical disk unit 401 shown in FIG. 7 is characterized in that an output signal from a back monitor element 412a incorporated in advance in a laser unit 412, the back monitor element outputting a current proportional to the light amount of the laser beam 11 radiated by the laser unit 412, is fed back to the main control circuit 131 independent of a power control circuit 134.

As shown in FIG. 7, to the main control circuit 131, there are inputted a first power monitor signal P1 produced when the light amount of the third laser beam 13 split from the laser beam 11 oriented to the optical disk 1 by an APC detecting system, i.e., the second beam splitter 118 is detected by the second light detector 124, and a back monitor signal P2 outputted from the back monitor element 412a of the laser unit 412.

To the back monitor P2, a signal proportional to light amount of the laser beam 11 radiated by the laser unit 412 is outputted irrespective of a position of the convex lens 117a of the relay lens 117. This back monitor signal P2 is compared with the output signal P1 from the light detector 124 for APC, whereby positional information on one lens of the relay lens 117, i.e., the convex lens 117a can be obtained.

That is, by a control loop of an APC monitor system (second light detector 124, power control 134, laser driver 132, and laser unit 412), an output of the light detector 124 for APC is controlled to be fed back to a predetermined value so that the light amount of the laser beam 11 on the objective lens 113 can be maintained at a predetermined light amount. However, when the convex lens 117a of the relay lens 117 is moved along the optical axis O, the light amount of the laser beam 11 radiated from the laser unit 412 changes by feedback control.

A position (movement value) of the convex lens 117a of the relay lens 117 can be detected by monitoring a change in the light amount of this laser beam 11.

In addition, in the optical disk 1 on which the thickness of the light transmission layer 1c is recorded in advance at a predetermined position of the recording layer 1b of the optical disk 1, information on thickness of the recorded light transmission layer 1c is read, and the position of the convex lens 117a of the relay lens 117 is set to be temporarily fixed (a control value outputted from the relay lens position control section 135 to a position control coil 123 is approximately fixed according to the recorded thickness). In this manner, in the case where an error between a position of the convex lens 117a set by the main control unit 131 and an actual position of the convex lens 117a of the relay lens 117 is significant, and a dispersion exists for each component of the optical disk unit 401, an error between the position of the convex lens 117a set by the main control unit 131 and the actual position of the convex lens 117a is corrected in advance in an arbitrary optical disk unit, thereby making it possible to ensure precise correction of a spherical aberration.

In the optical disk unit 401 shown in FIG. 7, the position of the convex lens 117a of the relay lens 117 can be obtained. Thus, when information is recorded in the optical disk 1, the magnitude of the laser drive current supplied to the laser unit 122 and the light amount of the actually radiated laser beam 11 can be calibrated (correlated).

In addition, as in the above described embodiment, in the optical disk unit 401 shown in FIG. 7 as well, although a description has been given by way of example of an optical disk of phase change type, the present invention can be used to a variety of optical head units and optical disk units for recording media each having an optical transmission layer. In addition, a reproduction only disk, magneto-optical disk, optical card, or the like is used as an applicable recording medium.

Figure 8:
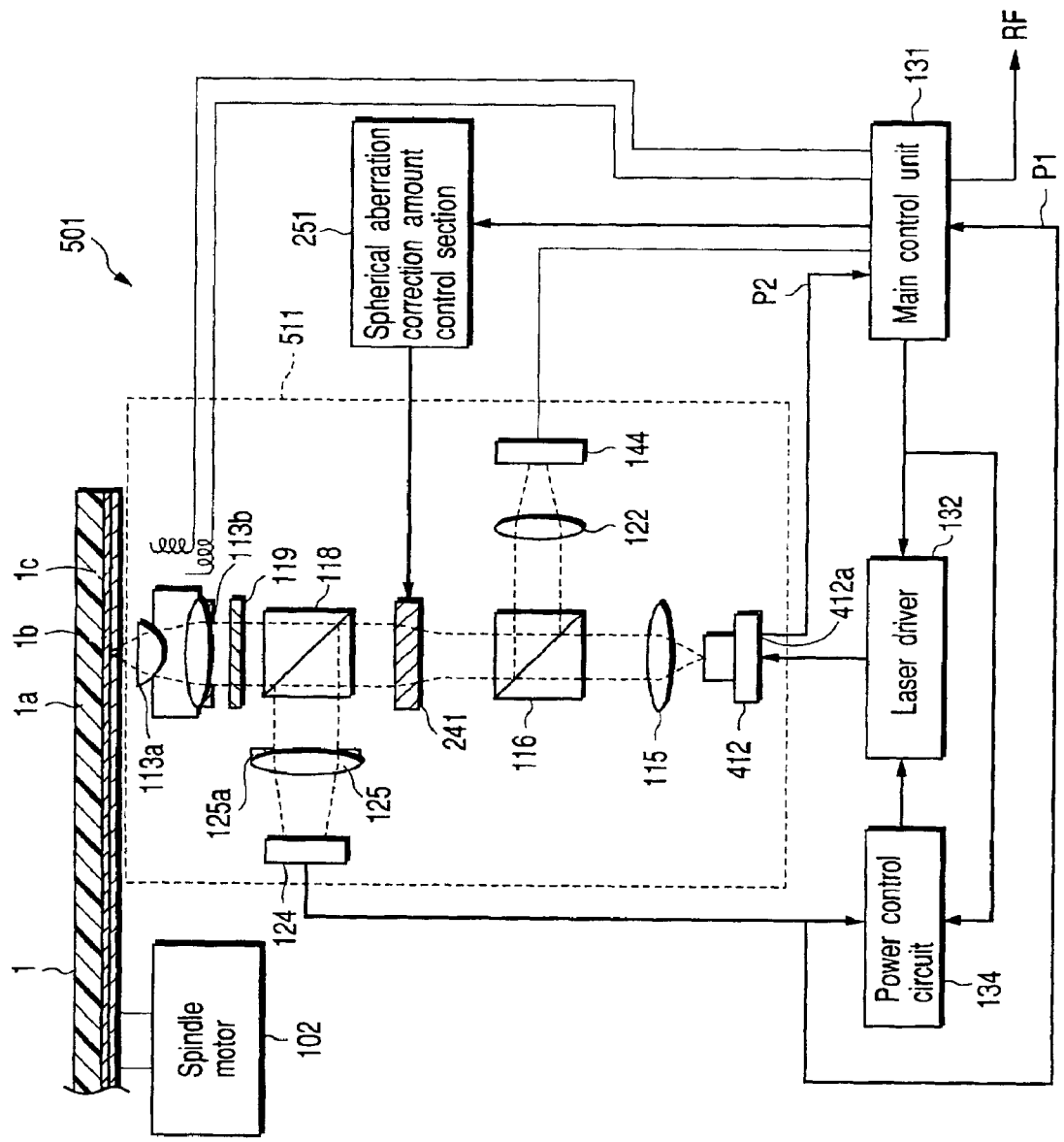
FIG. 8 is a schematic diagram illustrating an example of a modified embodiment of the optical disk unit shown in FIG. 7.

FIG. 8 shows a modified example of the optical disk unit shown in FIG. 7. This optical disk unit combines a concept of a back monitor signal shown in FIG. 7 with an optical disk unit using a liquid crystal element in place of the relay lens described previously by referring to FIG. 5. Like elements of another optical disk unit described previously are designated by like reference numerals. A detailed description is omitted here.

In an optical disk unit 501 shown in FIG. 8, an optical element capable of changing a refractive index by an external signal, for example, a liquid crystal element 241 of ECB (refractive index is changed by applied voltage) type and a spherical aberration correction quantity control unit 251 for changing a refractive index of the liquid crystal element 241 are inserted between a second beam splitter 118 for diverging the laser beam 13 for APC from the laser beam 11 oriented to the optical disk 1 and a first beam splitter 116 for diverging the reflection laser beam 12 to the first light detector 114.

The liquid crystal element 241 itself is not moved along the optical axis unlike the convex lens 117a of the relay lens 117. With respect to an error between the drive voltage supplied to the liquid crystal element 241 and a quantity of which aberration is actually corrected, in recording information into the optical disk 1, the magnitude of a laser drive current supplied to the laser unit 122 and the light amount of the laser beam 11 actually radiated can be calibrated (correlated) for an error of each component of the optical disk unit or an error of each component of the liquid layer element.

As has been described above, according to the present invention, in an optical head unit incorporated in an optical disk unit, the light amount of a laser beam emitted from a laser unit can be maintained constantly without an effect of the thickness error of a light transmission layer (transparent cover) of an optical disk having passed through the laser beam radiated from the laser unit. In order to precisely monitor laser beam power, the laser beam passed through a relay lens when viewed from the laser unit is used for a monitoring laser beam between the relay lens and the objective lens.

In addition, an opening restriction is provided to an imaging lens for imaging a laser beam at the power monitoring light detector for monitoring the light amount of the laser beam, whereby the light amount of the monitoring laser beam has a correlation equivalent to the laser beam incident to the objective lens or a predetermined correlation. Thus, there is achieved fluorescence control of a laser unit capable of constantly maintaining the light amount of the laser beams focused on the recording layer of the optical disk by the objective lens. The monitoring laser beam is detected by a light detector at which an opening restriction function is provided, whereby arrangement of optical elements after diverged can be reduced or eliminated, and the optical head unit is miniaturized.

Further, the refractive index changes according to applied voltage instead of the relay lens. For example, even if a liquid crystal element of ECB type is used, a similar optical head unit is obtained.

Furthermore, the light amount of the laser beam radiated from the laser unit is compared with that of the laser beam after correcting an effect of the thickness error of the light transmission layer of an optical disk, thereby making it possible to sense a position of a movable lens of the relay lens for correcting an effect of the thickness error of the light transmission layer. In this manner, the set value of the position of the movable lens of the relay lens can be calibrated with an actual position of the movable lens of the relay lens.

The refractive index changes according to the applied voltage instead of the relay lens. For example, even if a liquid crystal element of ECB type, for example, is used, a deviation (individual error) between the applied voltage and actual refractive index can be calibrated.

That is, according to the present invention, in an optical disk unit and optical head unit capable of recording at a high density in which the thickness of a surface cover layer of an optical disk is decreased while increasing a number of openings NA of the objective lens mounted on the optical head unit, an effect of a spherical aberration caused by the thickness error of the surface cover layer, i.e., a light transmission layer of the optical disk can be prevented. Thus, the recording density is improved, and the capacitance is increased. According to the present invention, even when one lens of a relay lens consisting of a convex lens and a concave lens is moved along an optical axis in order to restrain an effect o the thickness error of the light transmission layer, the light amount of the laser beam passing through an objective lens and focused on a recording face of an optical disk can be maintained constantly, thus making it possible to ensure stable information recording and stable signal reproduction. In addition, there is no need to detect a movement quantity (position) of a relay lens.

As has been described above, according to the present invention, in an optical head used for recording information into an optical disk and reproducing information from the optical disk and an optical disk unit having the optical head, an effect of a spherical aberration caused by the thickness of a surface resin layer of the optical disk can be reduced. In this manner, a change in light amount of the laser beam converged on the recording face of the optical disk by the objective lens is prevented, making it possible to ensure stable information recording and stable information reproduction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk unit that emits a light beam to an optical disk, which includes an information recording layer and a light transmission layer for protecting the information recording layer, and that causes the light beam to fall the optical disk from the light transmission layer, thereby recording information or reproducing information, comprising:

a light emitting unit that emits a light beam with a predetermined wavelength;

a focusing unit configured to focus the light beam from the light emitting unit at a predetermined position of the information recording layer of the optical disk;

a wavefront transforming optical element provided along an optical axis defined between the light emitting unit and the focusing unit, to transform a wavefront of the light beam guided to the focusing unit to the light emitting unit;

a thickness difference detection unit to detect a thickness difference of the light transmission layer of the optical disk positioned between the focusing unit and the information recording layer of the optical disk;

a wavefront transforming optical element control unit to control the wavefront transforming optical element, the wavefront transforming optical element is reducing a spherical aberration based on a thickness error of the light transmission layer of the optical disk:

a beam splitter provided between the wavefront transforming optical element and the focusing unit, the beam splitter reflecting in a predetermine direction a part of the light beam oriented from the wavefront transforming optical element to the focusing unit;

a light detector that receives a light beam split from the light beam oriented from the wavefront transforming optical element to the focusing unit by the beam splitter, and outputs an electrical signal corresponding to the light amount of the received light beam; and an output control unit that controls the light amount of the light beam radiated by the light emitting unit based on the magnitude of the electrical signal outputted from the light detector, wherein the wavefront transforming optical element includes a first lens and a second lens either one is a convex lens and the other is a concave lens, and wherein an opening restriction mechanism free of an effect of change in beam diameter on the focusing unit caused when either of the first and second lenses of the wavefront transforming optical element is moved is provided at the light incidence side of the light detector.

2. An optical disk unit according to claim 1, wherein the light detector is integrally provided at least one of a predetermined position in the vicinity of a light emitting side of the beam splitter and a light emitting face thereon.

3. An optical disk unit that emits a light beam to an optical disk, which includes an information recording layer and a light transmission layer for protecting the information recording layer, and that causes the light beam to fall the optical disk from the light transmission layer, thereby recording information or reproducing information, comprising:

a light emitting unit that emits a light beam with a predetermined wavelength;

a focusing unit configured to focus the light beam from the light emitting unit at a predetermined position of the information recording layer of the optical disk;

a wavefront transforming optical element provided along an optical axis defined between the light emitting unit and the focusing unit, to transform a wavefront of the light beam guided to the focusing unit to the light emitting unit;

a thickness difference detection unit to detect a thickness difference of the light transmission layer of the optical disk positioned between the focusing unit and the information recording layer of the optical disk;

a wavefront transforming optical element control unit to control the wavefront transforming optical element, the wavefront transforming optical element is reducing a spherical aberration based on a thickness error of the light transmission layer of the optical disk;

a beam splitter provided between the wavefront transforming optical element and the focusing unit, the beam splitter reflecting in a predetermine direction a part of the light beam oriented from the wavefront transforming optical element to the focusing unit;

a light detector that receives a light beam split from the light beam oriented from the wavefront transforming optical element to the focusing unit by the beam splitter, and outputs an electrical signal corresponding to the light amount of the received light beam;

an output control unit that controls the light amount of the light beam radiated by the light emitting unit based on the magnitude of the electrical signal outputted from the light detector;

a second beam splitter provided between the light emitting unit and the focusing unit, the second beam splitter splits a light beam oriented from the light emitting unit to the optical disk and a reflection light beam reflected by the optical disk from each other; and a second light detector that outputs an electrical signal corresponding to light amount of the reflection light beam split by the second beam splitter, wherein the wavefront transforming optical element includes a first lens and a second lens either one is a convex lens and the other is a concave lens, wherein the wavefront transforming optical element control unit to control the one of the first lens and the second lens of the wavefront transforming optical element based on an output signal outputted by the second light detector indicating a thickness difference of the light transmission layer of the optical disk and to suppress a spherical aberration with respect to the light transmission layer of the optical disk, and wherein the light emitting unit includes a back monitor element capable of monitoring light amount of a light beam radiated by itself, wherein an approximate position of the first lens or the second lens of the wavefront transforming optical element can be set by controlling the wavefront transforming optical element control unit based on a back monitor signal outputted by the back monitor element and the output signal outputted by the second light detector indicating the light amount of the light split by the second beam splitter.

4. An optical disk unit that emits a light beam to an optical disk, which includes an information recording layer and a light transmission layer for protecting the information recording layer, and that causes the light beam to fall the optical disk from the light transmission layer, thereby recording information or reproducing information, comprising:

a light emitting unit that emits a light beam with a predetermined wavelength;

a focusing unit configured to focus the light beam from the light emitting unit at a predetermined position of the information recording layer of the optical disk;

a wavefront transforming optical element provided alone an optical axis defined between the light emitting unit and the focusing unit, to transform a wavefront of the light beam guided to the focusing unit to the light emitting unit;

a thickness difference detection unit to detect a thickness difference of the light transmission layer of the optical disk positioned between the focusing unit and the information recording layer of the optical disk;

a wavefront transforming optical element control unit to control the wavefront transforming optical element, the wavefront transforming optical element is reducing a spherical aberration based on a thickness error of the light transmission layer of the optical disk;

a beam splitter provided between the wavefront transforming optical element and the focusing unit, the beam splitter reflecting in a predetermine direction a part of the light beam oriented from the wavefront transforming optical element to the focusing unit;

a light detector that receives a light beam split from the light beam oriented from the wavefront transforming optical element to the focusing unit by the beam splitter, and outputs an electrical signal corresponding to the light amount of the received light beam;

an output control unit that controls the light amount of the light beam radiated by the light emitting unit based on the magnitude of the electrical signal outputted from the light detector;

a second beam splitter provided between the light emitting unit and the focusing unit, the second beam splitter splits a light beam oriented from the light emitting unit to the optical disk and a reflection light beam reflected by the optical disk from each other; and a second light detector that outputs an electrical signal corresponding to light amount of the reflection light beam split by the second beam splitter, wherein the wavefront transforming optical element includes a first lens and a second lens either one is a convex lens and the other is a concave lens, wherein the wavefront transforming optical element control unit to control the one of the first lens and the second lens of the wavefront transforming optical element based on an output signal outputted by the second light detector indicating a thickness difference of the light transmission layer of the optical disk and to suppress a spherical aberration with respect to the light transmission layer of the optical disk, and wherein the light emitting unit includes a back monitor element capable of monitoring light amount of a light beam radiated by itself, wherein a predetermined voltage to be applied to the wavefront transforming optical element can be set by controlling the wavefront transforming optical element control unit based on a back monitor signal outputted by the back monitor element and the output signal outputted by the second light detector and indicating the light amount of light split by the second beam splitter.

* * * * *